(No Model.)
J. S. & A. RAY.
KNIFE.
No. 269,109. Patented Dec. 12, 1882.
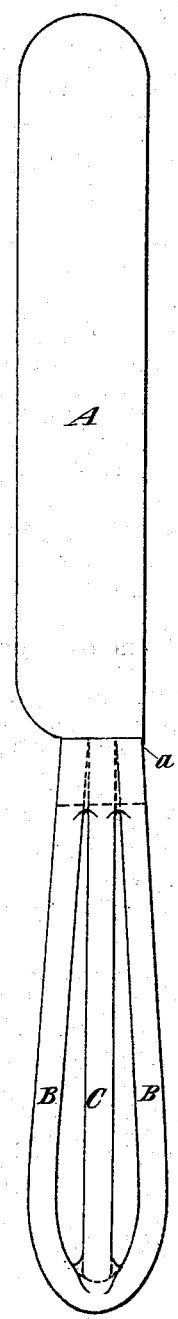
Witnesses
Fred'k Haynes
George H. Botts
Inventors
James S. Ray
Ashbel Ray
by their Attorneys
Brown & Brown

UNITED STATES PATENT OFFICE.

JAMES S. RAY AND ASHBEL RAY, OF EAST HADDAM, CONNECTICUT.

KNIFE.

SPECIFICATION forming part of Letters Patent No. 269,109, dated December 12, 1882.

Application filed May 8, 1882. (No model.)

*To all whom it may concern:*

Be it known that we, JAMES S. RAY and ASHBEL RAY, both of East Haddam, in the county of Middlesex and State of Connecticut, have invented a certain new and useful Improvement in Knives, of which the following is a specification.

Our invention relates principally to table-knives; but it is also applicable to all or nearly all knives in which the blade is rigidly fastened to the handle.

Our invention consists in the combination, with a knife-handle composed of a wire bent to form a loop and a brace extending longitudinally through said loop, the ends of the loop and brace having in them a slit or kerf, of a blade having a shank or tongue fitted in said slit or kerf and soldered or brazed therein, as particularly hereinafter described.

In the accompanying drawings, Figure 1 represents a side view of a knife embodying our invention; and Fig. 2 represents an edge view thereof, showing the handle and blade separated.

Similar letters of reference desiguate corresponding parts in all the figures.

A designates the blade of the knife, which is secured in a handle of skeleton form. The handle is composed of a piece of wire bent so as to form a loop, B, the sides of which form the sides of the handle, and a second piece of wire, C, which is straight and extends lengthwise of the loop, and which forms a brace to the loop. One end of the brace C abuts against the rounded end of the loop, and is secured thereto by soldering or brazing, and the other end of the brace is placed between the two end portions of the loop B, and the three ends are soldered or brazed together. In the end of the handle is formed a cleft or kerf, $a$, which extends through the ends of the wire B and the interposed brace C, and the blade A is provided with a shank or tongue, $b$, which is inserted in the cleft or kerf $a$, and is secured therein by brazing or soldering. The knife may then be finished by plating or otherwise.

By our invention we provide a knife of very neat appearance, which may be cheaply manufactured, and is very durable, and we connect the blade and the handle in a very secure manner.

We do not here claim broadly a handle for a knife or other article of table-ware composed of a looped wire and a central brace, as such a handle is made the subject of another application for Letters Patent filed herewith.

We are aware that knife-handles have been made of a single wire bent to form a loop the ends of which receive the shank or tongue of the blade between them, and hence we do not claim such a construction as included in our invention.

What we claim as our invention, and desire to secure by Letters Patent, is—

The combination, with the knife-handle composed of the wire loop B and brace C, and having in them the slit or kerf $a$, of the blade A, fitted in said slit or kerf and soldered or brazed therein, substantially as specified.

JAMES S. RAY.
      ASHBEL RAY.

Witnesses:
 JULIUS ATTWOOD,
 F. L. RAY.